Patented Nov. 7, 1944

2,362,128

UNITED STATES PATENT OFFICE 2,362,128

INSECTICIDE

Samuel I. Gertler and Herbert L. J. Haller, Washington, D. C., assignors to Claude R. Wickard, as Secretary of Agriculture of the United States of America, and his successors in office No Drawing. Application July 28, 1942,
Serial No. 452,614

16 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to compositions of matter which are useful as insect killers, fly sprays and the like.

The principal object of this invention is to provide new and improved insecticides.

Another object is to provide materials which will increase the effectiveness of other insecticides.

Another object is to provide compounds which compare favorably with or exceed pyrethrum extracts in toxicity to insects, or which can be used in lieu of or together with pyrethrum extracts of low concentration to increase their effectiveness.

We have found that substances belonging to a certain class of organic compounds have a specific toxic effect upon harmful insects and our invention consists in the application of said substances to the destruction of insect pests.

The novel insecticides found by us belong to the class of organic compounds known as nitrogen substituted amides of a condensed heterocyclic aromatic nuclear acid, namely, piperonylic acid. These compounds may be designated by the general formula

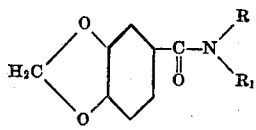

where R represents a member of the group consisting of hydrogen, an alkyl radical, an aryl radical, a halogenated aryl radical, a nitro-substituted aryl radical, a cyclo-aliphatic radical and an aralkyl radical, and $R_1$ is selected from an alkyl radical and an aralkyl radical.

The compounds were prepared by the reaction of piperonoyl chloride with primary or secondary amines. However, any general method for preparing compounds of this class may be used.

The compounds were found to be particularly valuable for use in fly spray preparations both by themselves and in admixture with pyrethrum solutions as synergists to increase the toxicity of these solutions. The following tables show the value of these compounds with respect to their toxicity to flies. For the sake of uniformity all solutions were made up in a fluid carrier comprising a solvent consisting of 90% of refined kerosene and 10% of acetone. In practice, however, any other suitable solvent may be used.

Table I gives examples comparing the relative efficiency of the new insecticides with that of a standard pyrethrum-kerosene fly spray containing 100 mg. of pyrethrins per 100 cc. of solution. This standard solution showed a 33% kill in 48 hours. All tests were conducted by the standard Peet-Grady method.

Table I

| Compound | Concentration | 48 hours kill | Relative efficiency |
|---|---|---|---|
| | Per cent | Per cent | Per cent |
| N,N-diethylpiperonylamide | 1.0 | 36 | 109 |
| N,N-dipropylpiperonylamide | 1.0 | 41 | 114 |
| N-butylpiperonylamide | 1.0 | 26 | 80 |
| N-isobutylpiperonylamide | 1.0 | 31 | 94 |
| N,N-diisobutylpiperonylamide | 1.0 | 27 | 82 |
| N-(o-nitrophenyl)piperonylamide | 0.2 | 26 | 80 |

Table II illustrates the pronounced synergistic effect of this class of compounds. In these tests the solutions were made up in the same refined kerosene-acetone solvent, except that only half of the standard concentration of pyrethrins (namely, 50 mg. of pyrethrins per 100 cc. of solution) were used in addition to the compounds. This pyrethrin solution by itself gave a kill of 14% in 48 hours.

Table II

| Compound | Concentration | 48 hours kill compound; pyrethrum | Relative efficiency |
|---|---|---|---|
| | Per cent | Per cent | Per cent |
| N-ethylpiperonylamide | 0.2 | 30 | 214 |
| N,N-diethylpiperonylamide | 1.0 | 92 | 657 |
| N-propylpiperonylamide | 0.2 | 29 | 207 |
| N,N-dipropylpiperonylamide | 1.0 | 83 | 593 |
| N-butylpiperonylamide | 1.0 | 95 | 679 |
| N-butylpiperonylamide | 0.2 | 55 | 393 |
| N-isobutylpiperonylamide | 1.0 | 97 | 693 |
| N,N-diisobutylpiperonylamide | 1.0 | 81 | 579 |
| N,N-diisobutylpiperonylamide | 0.2 | 62 | 444 |
| N-amylpiperonylamide | [1] Saturated | 51 | 364 |
| N-amylpiperonylamide | 0.2 | 26 | 186 |
| N-cyclohexylpiperonylamide | Saturated | 20 | 144 |
| N-benzylpiperonylamide | Saturated | 21 | 150 |
| N,N-dibenzylpiperonylamide | 0.2 | 53 | 379 |
| N-(o-tolyl)piperonylamide | Saturated | 35 | 250 |
| N-di-(2-ethylhexyl)piperonylamide | 1.0 | 74 | 529 |
| N-(o-chlorophenyl)piperonylamide | Saturated | 73 | 521 |
| N-(m-chlorophenyl)piperonylamide | 0.2 | 23 | 164 |
| N-(o-bromophenyl)piperonylamide | 1.0 | 80 | 571 |
| N-(m-bromophenyl)piperonylamide | 1.0 | 27 | 193 |
| N-(o-nitrophenyl)piperonylamide | 0.2 | 80 | 571 |

[1] Less than 1.0%.

The results show that the new insecticides, besides showing a pronounced increase in toxicity, can also effect a considerable saving in the use of pyrethrins. To better illustrate the extent of the synergism produced, the table also shows the percentage increase in killing power by the new compound over the pyrethrin solution by itself. This is represented by percent kill compared with pyrethrum solution itself and is also designated as relative efficiency. Concentrations designated as saturated contained less than 0.2% of compound in solution.

It is to be understood that the above-mentioned compounds are used merely as examples and that this invention is not restricted by such use. They may also be used with other insecticides such as derris, nicotine, and synthetic organic compounds, either in solution, suspension, or as dusts. Also, the above examples are not to be construed as limiting either the method of application of these novel insecticides or the kinds of insects to which they may be applied.

Having thus described our invention, we claim:

1. A method of destroying insects comprising contacting the insects with an insecticide in which an essential active ingredient is

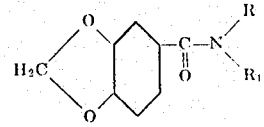

where R represents a member of the group consisting of hydrogen, an alkyl radical, an aryl radical, a halogenated aryl radical, a nitro-substituted aryl radical, a cycloaliphatic radical and an aralkyl radical, and $R_1$ is selected from an alkyl radical and an aralkyl radical.

2. The subject-matter of claim 1 in which the insecticide also contains pyrethrum.

3. An insecticidal composition comprising a fluid carrier having dissolved therein

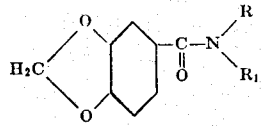

where R represents a member of the group consisting of hydrogen, an alkyl radical, an aryl radical, a halogenated aryl radical, a nitro-substituted aryl radical, a cycloaliphatic radical and an aralkyl radical, and $R_1$ is selected from an alkyl radical and an aralkyl radical.

4. The subject-matter of claim 3, in which the composition also contains pyrethrum.

5. A method of destroying insects comprising contacting the insects with an insecticide in which an essential active ingredient is N,N-diethylpiperonylamide.

6. The subject-matter of claim 5, in which the insecticide also contains pyrethrum.

7. An insecticidal composition comprising a fluid carrier having N,N-diethylpiperonylamide dissolved therein.

8. The subject-matter of claim 7, wherein the composition also contains pyrethrum.

9. A method of destroying insects comprising contacting the insects with an insecticide in which an essential active ingredient is N-butylpiperonylamide.

10. The subject-matter of claim 9, in which the insecticide also contains pyrethrum.

11. An insecticidal composition comprising a fluid carrier having N-butylpiperonylamide dissolved therein.

12. The subject-matter of claim 11, wherein the composition also contains pyrethrum.

13. A method of destroying insects comprising contacting the insects with an insecticide in which an essential active ingredient is N-isobutylpiperonylamide.

14. The subject-matter of claim 13, in which the insecticide also contains pyrethrum.

15. An insecticidal composition comprising a fluid carrier having N-isobutylpiperonylamide dissolved therein.

16. The subject-matter of claim 15, wherein the composition also contains pyrethrum.

SAMUEL I. GERTLER.
HERBERT L. J. HALLER.